United States Patent [19]

Lee

[11] Patent Number: 5,209,422

[45] Date of Patent: May 11, 1993

[54] TAPE TENSION AND BRAKING CONTROL DEVICE AND METHOD

[75] Inventor: Chun-Sung Lee, Inchon, Rep. of Korea

[73] Assignee: SamSung Electronics, Co., Ltd., Suwon, Rep. of Korea

[21] Appl. No.: 603,301

[22] Filed: Oct. 25, 1990

[30] Foreign Application Priority Data

Oct. 26, 1989 [KR] Rep. of Korea ............... 1989-15440

[51] Int. Cl.⁵ ..................... G11B 15/18; B65H 77/00
[52] U.S. Cl. ................................. 242/191; 242/75; 242/75.47
[58] Field of Search ............... 242/191, 186, 75.4, 242/75.45, 75.47; 360/71, 74.1, 74.2

[56] References Cited

U.S. PATENT DOCUMENTS

| | | | |
|---|---|---|---|
| 3,764,087 | 10/1973 | Paananen et al. | 242/191 X |
| 3,913,866 | 10/1975 | Hankins | 242/191 |
| 4,157,488 | 6/1979 | Allan | 242/191 X |
| 4,213,583 | 7/1980 | Mitani et al. | 242/186 |
| 4,333,115 | 6/1982 | Junio | 242/186 X |
| 4,381,089 | 4/1983 | Kondo | 242/191 |
| 4,448,368 | 5/1984 | Skalko | 242/191 X |
| 4,478,376 | 10/1984 | Sakaguchi et al. | 242/191 |
| 4,479,159 | 10/1984 | Kamei et al. | 242/191 X |
| 4,496,117 | 1/1985 | Kashiwagi et al. | 242/191 |
| 4,508,280 | 4/1985 | Hayosh et al. | 242/191 |
| 4,553,182 | 11/1985 | Narita | 242/191 X |
| 4,573,645 | 3/1986 | Harris, Jr. | 242/75.47 |
| 4,696,439 | 9/1987 | Sukigara et al. | 242/191 X |

*Primary Examiner*—Daniel P. Stodola
*Assistant Examiner*—John P. Darling
*Attorney, Agent, or Firm*—Robert E. Bushnell

[57] ABSTRACT

A method and apparatus controls reel motors to maintain an even tape tension of a tape between a supply reel and a take-up reel when a tape running mode is changed to a stop mode. One method includes the steps of: determining a supply reel period of the supply reel and a take-up reel period of the take-up reel; braking the supply reel a first delay interval after braking the take-up reel when the take-up reel period is longer than the supply reel period; braking the take-up reel a second delay interval after braking the supply reel when the supply reel period is longer than the take-up reel period; and braking the supply reel and the take-up reel simultaneously when the supply reel period equals the take-up reel period.

15 Claims, 3 Drawing Sheets

TAPE TENSION AND BRAKING CONTROL DEVICE AND METHOD

BACKGROUND OF THE INVENTION

The present invention relates to a brake control method of a reel motor in a tape recording/reproducing apparatus, particularly to a method for providing an even tape tension during braking of reel motors.

Generally, the moment of inertia of a rotating body as shown by FIG. 1 is directly proportional to the mass and radius of the rotating body. This relationship can be represented as follows;

$$MI = (\tfrac{1}{2})MR^2 \quad (1)$$

where,
MI: moment of inertia of the rotating body
M: mass of the rotating body
R: radius of the rotating body.

The above moment of inertia of the rotating body is also applicable to the reel of the tape recording/reproducing apparatus. That is, in the case that the tape is being rolled up on the reel, the reel will have the moment of inertia with a value determined by the above formula (1).

FIGS. 2A and 2B illustrate the tape being wound on the reels. In FIG. 2A, the amount of the tape wound on a supply reel is more than that on a take-up reel. In this state, if the two reels are simultaneously stopped with equal force, the tape will become loose, because the moment of inertia of the supply reel is greater than that of the take-up reel.

On the other hand, in the case that the amount of the tape wound on the take-up reel is more than that on the supply reel as shown in FIG. 2B, if the two reels are simultaneously stopped with equal force, the tape will become tight, because the moment of inertia of the take-up reel is greater than the supply reel. That is, if the rotating two reels are stopped in a state that the amounts of tapes of the supply reel and the take-up reel are different, the tape becomes loose or tight since the moment of inertia differs between the two reels.

SUMMARY OF THE INVENTION

Accordingly, it is an object of the present invention to provide a method for maintaining an even tape tension when a tape running mode is changed to a stop mode, by means of controlling the stopping times of the two reels corresponding to a difference between the supply reel period and the take-up reel period.

According to one aspect of the present invention, a system includes a microprocessor for controlling the system, a reel motor driver for controlling operation and direction of reel motors according to a reel on/off control signal and a reel direction control signal, first and second speed sensors for sending signals from a supply frequency generator and take-up frequency generator to the microcomputer by analyzing the revolution speed of the reel motors, and first and second brake drivers for stopping the reel motors when brake control signals are sent from the microcomputer.

According to another aspect of the invention, in order to maintain an even tape tension between the reels, the tape recording/reproducing method includes the steps of: determining a period Ts of a supply reel and a period Tt of a take-up reel; providing a supply reel brake control signal for stopping the supply reel from rotating and after a supply delay period, providing a take-up reel brake control signal for stopping the take-up reel when the supply reel period Ts is greater than the take-up reel period Tt; providing the take-up reel brake control signal for stopping rotation of the take-up reel and after a take-up delay period, providing a supply reel brake control signal for stopping the supply reel when the take-up reel period Tt is greater than the supply reel period Ts; and simultaneously providing the supply reel and take-up reel brake control signals for stopping rotation of the supply and take-up reels simultaneously when the supply reel period Ts is equal to the take-up reel period Tt.

BRIEF DESCRIPTION OF THE DRAWINGS

Reference made, by way of example, to the accompanying drawings, in which.

DETAILED DESCRIPTION OF THE PREFERRED EMBODIMENT

Figure 1:
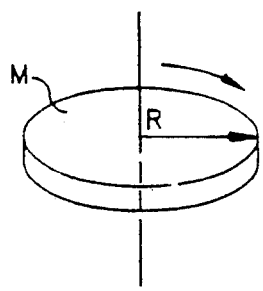
FIG. 1 illustrates a disc with a radius R and a mass M.
Figure 2A:
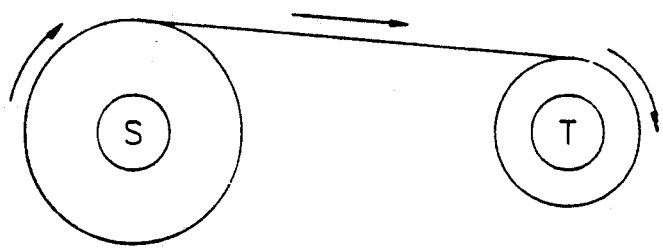
FIG. 2A and FIG. 2B illustrate different examples of tape running transfer from supply to take-up reels.
Figure 2B:
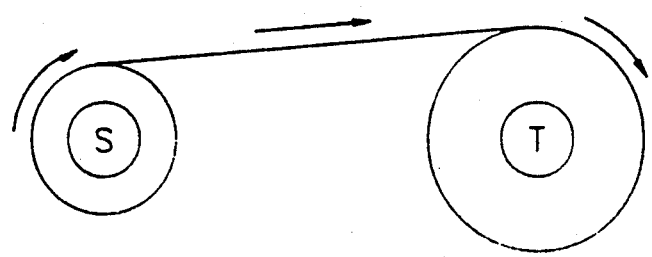
Figure 3:
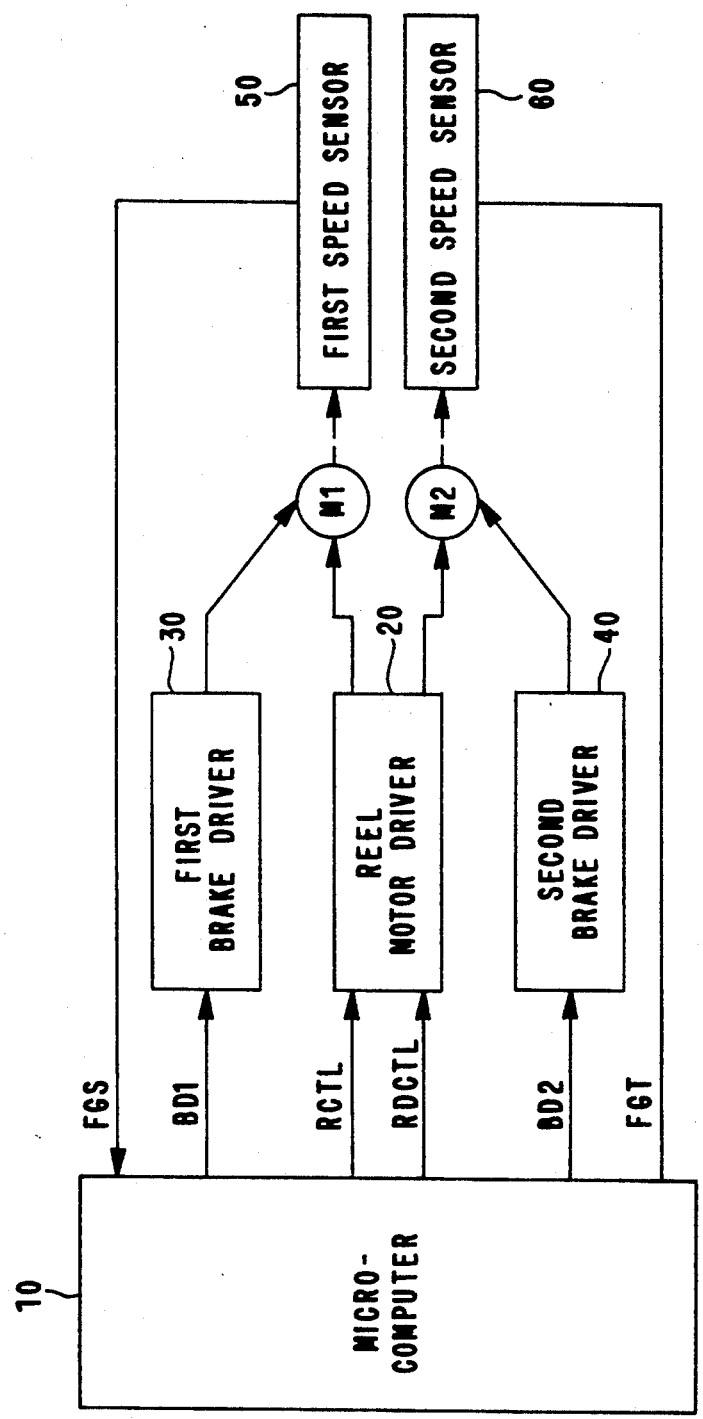
FIG. 3 illustrates a block diagram of a system for carrying out the inventive method.

Referring to FIG. 3, a system for carrying out the present invention includes a microprocessor 10 which controls the overall system. A reel motor driver 20 controls the operation and rotational direction of supply and take-up reel motors M1, M2 according to a reel on/off control signal RCTL and a reel direction control signal RDCTL provided from the microcomputer 10. First and second speed sensors 50, 60 provide the microcomputer 10 with a FGS (Supply Frequency Generator) signal and a FGT (Take-up Frequency Generator) signal determined by analyzing revolution speeds of the supply and take-up reel motors M1, M2. Then, first and second brake drivers 30, 40 stop the reel motors M1, M2 when supply brake control signal BD1 and take-up brake are sent from the microcomputer 10.

Figure 4:
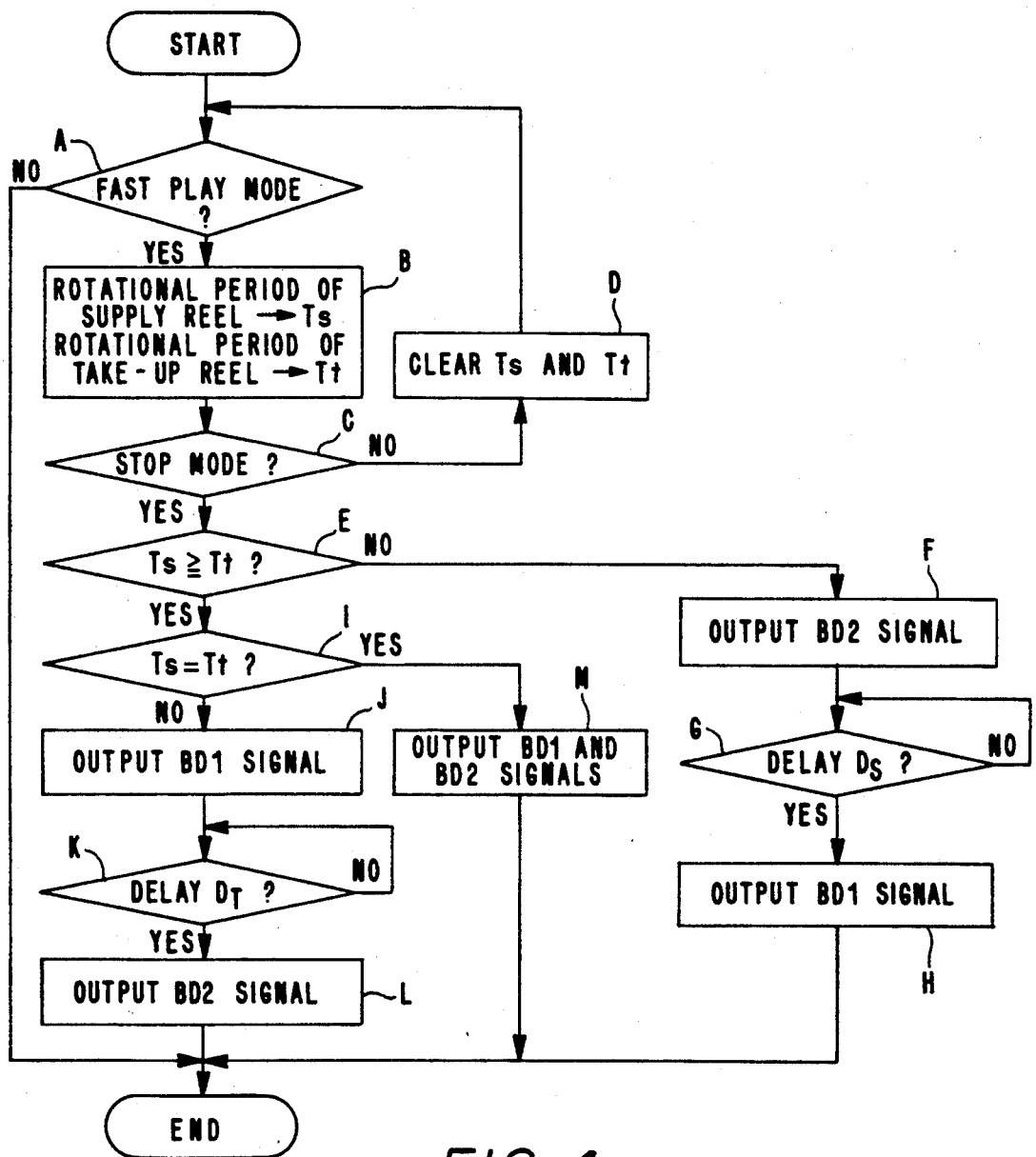
FIG. 4 is a flow chart for explaining the method of a preferred embodiment of the present invention.

Referring to FIG. 4, in order to maintain an even tape tension on the tape between the reels, the system determines a supply period Ts being a time required for one revolution of the supply reel and a take-up period Tt being a time required for one revolution of the take-up reel. Then when Ts>Tt, the system provides BD1 to stop the supply reel from rotating and after a take-up delay period Dt, BD2 is provided to stop the take-up reel from rotating. On the contrary when Tt>Ts, BD2 is provided to stop the take-up reel and after a supply delay periods Ds, BD1 is provided to stop the supply reel from rotating. When Ts=Tt, BD1 and BD2 are simultaneously provided to simultaneously stop the supply and take-up reels.

It is exemplary that the reel motor M1 represents a supply reel motor and the reel motor M2 a take-up reel motor. In order to operate the reel motors M1 and M2, the microcomputer 10 must send the reel on/off control signal RCTL and the reel direction control signal RDCTL to the reel motor driver 20, which drives the reel motors M1 and M2 according to the above two signals RCTL and RDCTL.

The rotating speeds of the reel motors M1 and M2 depend upon the amount of the tape wound on the respective reels. First and second speed sensors 50, 60 detect rotating frequencies of the rotating reel motors M1 and M2, to provide the FGS and FGT signals to the microcomputer 10. The microcomputer 10 analyzes the FGS and FGT signals to provide brake control signals BD1, BD2 in accordance with Ds and Dt when the rotating reel motors M1, M2 are put into the stop mode. In response to the brake control signals BD1 and BD2, first and second brake drivers 30, 40 control the speed of the reel motors M1, M2, maintaining even tape tension.

The steps of a preferred embodiment of maintaining even tape tension while changing the tape running modes from fast play mode to the stop mode will now be described with reference to FIG. 4. The microcomputer 10 determines whether the tape is in the fast play mode at step A. Then, at step B when the tape is in the fast play mode, the microcomputer 10 determines the periods Ts and Tt from the FGS and FGT signals generated respectively from the first and the second speed sensors 50, 60. The supply period Tt corresponds to the FGS signal, while the take-up period Tt corresponds to the FGT signal. After determining whether the current fast play mode is changed to the stop mode at step C, if the reel motors are not in the stop mode, the microcomputer 10 proceeds to step D, clears the values of Ts and Tt, and again determines the periods Ts and Tt. In the other words, if the fast play mode is not changed to the stop mode, the periods Ts and Tt are repeatedly determined.

When the current fast play mode is changed to the stop mode, the microcomputer 10 determines whether the period Ts is greater or equal to the period Tt at step E. In the case that Tt>Ts, the greater moment of inertia of the take-up reel causes the tape to be tight when stopped, when the reel motors M1 and M2 are concurrently braked with equal force.

Therefore, if Tt<Ts, the microcomputer 10 brakes the take-up reel motor M2 in step F by providing the take-up brake control signal BD2 to the second brake driver 40 and after the supply delay period Ds passes take up at step G, the supply reel motor M1 is stopped by providing the supply brake control signal BD1 to the first brake controller 30 at step H.

The microcomputer 10 determines the take-up and supply delay times as increments of the periods Tt and Ts. At this time, since the supply reel motor M1 is stopped after the take-up reel motor M2 is stopped, the moment of inertia generated from the take-up reel and the moment of inertia generated from the supply reel are canceled relative to each other.

If the period Tt is not greater than the period Ts in step E, the microcomputer 10 determines whether the supply period Ts is equal to the take-up period Tt at step I. In the case that Ts>Tt, the microcomputer 10 brakes the supply reel motor M1 by providing the supply brake control signal BD1 to the first brake driver 30 at step J, and after the take-up time delay period Dt passes at step K, and then brakes the take-up reel motor M2 is stopped by providing the take-up brake control signal BD2 to the second brake driver 40 at step L. Since the amount of the tape wound on the supply reel is greater than that of the tape wound on the take-up reel, the moment of inertia of the supply reel is greater. Accordingly, the tape wound on the take-up reel is prevented from being loosened, and an even tape tension is sustained.

When Ts=Tt, the moment of inertia of the tape wound on the take-up reel is equal to the moment of inertia of the tape wound on the supply reel, because the amount of the tape on each reel is the same. Therefore, microcomputer 10 simultaneously provides BD1 and BD2 to the first and the second brake drivers 30 and 40 causing the supply and take-up motors to stop simultaneously.

From the foregoing description of the preferred embodiment using the fast play mode, the present invention has the advantage of maintaining even tape tension when the reels are stopped, thus prolonging the life of the tape. This same advantage is available for braking tape reels for other embodiments of the same invention, such as for braking tape reels with tapes moving in a rewind mode, slow-motion mode, or any other mode of tape movement.

While the invention has been particularly shown and described with reference to a preferred embodiment, it will be understood by those skilled in the art that modifications in detail may be made without departing from the spirit and scope of the invention.

What is claimed is:

1. A method for keeping an appropriate tape tension according to amounts of a tape wound on a supply reel and a take-up reel when a fast play mode is changed to a stop mode in a tape recording and/or reproducing apparatus having a microcomputer for controlling system operation, and direction of supply and take-up reel motors according to a reel on/off control signal and a reel direction control signal, a first speed sensor for providing a supply frequency generator signal to the microcomputer and a second speed sensor for providing a take-up frequency generator signal to the microcomputer by determining the revolution speed of the reel motors, and first and second brake controlling parts for stopping said reel motors when brake control signals are generated from the microcomputer, said method comprising the steps of:

determining a supply reel period of said supply reel and a take-up reel period of said take-up reel;

braking the supply reel a first delay interval after braking the take-up reel when the take-up reel period is longer than the supply reel period;

braking the take-up reel a second delay interval after braking the supply reel when the supply reel period is longer than the take-up reel period; and braking the supply reel and the take-up reel simultaneously when the supply reel period is equal to the take-up reel period.

2. A tape tension control circuit, comprising:

means providing first and second frequency signals respectively representative of speeds of revolution of rotating supply and take-up reels;

control means for determining a first period corresponding to the supply reel in dependence upon said first frequency signal, for determining a second period corresponding to the take-up reel in dependence upon said second frequency signal, for generating first and second brake control signals, and for adjusting a difference between a time of said generation of the first brake control signal and a time of said generation of the second brake control signal, in dependence upon said first and second periods; and means for stopping rotation of the supply and take-up reels in response to corresponding ones of said first and second brake control signals.

3. The tape tension control circuit of claim 2, wherein said control means:

generates said first brake control signal after generating said second brake control signal when said second period is longer than said first period.

4. The tape tension control circuit of claim 2, wherein said control means:
generates said second brake control signal after generating said first brake control signal when said first period is longer than said second period.

5. The tape tension control circuit of claim 2, wherein said control means:
generates said first brake control signal and said second brake control signal substantially simultaneously when said first period is substantially equal to said second period.

6. The tape tension control circuit of claim 2, further comprised of:
said control means generating on/off control signals and direction control signals; and
means for driving the supply and take-up reels in dependence upon said on/off control signals and direction control signals.

7. The tape tension control circuit of claim 2, further comprised of said control means:
providing the first brake control signal for braking the supply reel a first delay interval after braking the take-up reel when the second period is longer than the first period;
providing the second brake control signal for braking the take-up reel a second delay interval after braking the supply reel when the first period is longer than the second period;
simultaneously providing the first and second brake control signals for braking the supply reel and the take-up reel simultaneously when the first period is equal to the second period.

8. The tape tension control circuit of claim 2, further comprised of said control means:
determining whether the reels are in a rotating mode before determining said first and second periods;
determining whether said reels have been changed to a stop mode, after determining said first and second periods;
if said reels have not been changed to the stop mode, repeating said determining of the first period and determining of the second period until the reels are determined to be in the stop mode; and
if said rotating mode has been changed to the stop mode,
determining said first period of said supply reel and said second period of said take-up reel;
providing the first brake control signal for braking the supply reel after providing the second brake control signal for braking the take-up reel when the second period is longer than the first period;
providing the second brake control signal for braking the take-up reel after providing the first brake control signal for braking the supply reel when the first period is longer than the second period;
simultaneously providing the first and second brake control signals for simultaneously braking the supply reel and the take-up reel when the first period is equal to the second period.

9. The tape tension control circuit of claim 2, further comprised of said control means:
determining whether the circuit is in a fast play mode before determining said first and second periods;
determining whether said fast play mode has been changed to a stop mode, after determining said first and second periods;
if said fast play mode has not been changed to a stop mode, repeating said steps of determining a first period in dependence upon said first frequency signal and a second period in dependence upon said second frequency signal, until said fast play mode is determined to have been changed to a stop mode; and
if said fast play mode has been changed to a stop mode,
analyzing said first period of said supply reel and said second period of said take-up reel;
braking the supply reel after braking the take-up reel when the second period is longer than the first period;
braking the take-up reel after braking the supply reel when the first period is longer than the second period;
braking the supply reel and the take-up reel simultaneously when the first period is equal to the second period.

10. A tape tension control circuit, comprising:
means for providing first and second output signals respectively indicative of moments of inertia of rotating supply and take-up reels;
means for driving the supply and take-up reels;
control means for determining a first brake control signal in dependence upon said first output signal, for determining a second brake control signal in dependence upon said second output signal, for stopping rotation of the supply and take-up reels, for controlling braking, in dependence upon said first and second brake control signals, of the supply reel a first delay interval after braking of the take-up reel when a take-up reel stopping period is longer than a supply reel stopping period, for controlling braking, in dependence upon said first and second brake control signals, of the take-up reel a second delay interval after braking the supply reel when the supply reel stopping period is longer than the take-up reel stopping period, and for controlling braking, in dependence upon said first and second brake control signals, of the supply reel and the take-up reel simultaneously when the supply reel stopping period is equal to the take-up reel stopping period.

11. The tape tension control circuit of claim 10, wherein said control means comprises:
processing means for generating said first and second brake control signals in dependence upon said first and second output signals, respectively; and
means for stopping rotation of the supply and take-up reels in response to corresponding said first and second brake control signals.

12. The tape tension control circuit of claim 11, wherein said processing means generates on/off control signals and direction control signals; and said driving means regulates the supply and take-up reels to rotate in dependence upon said on/off control signals and direction control signals.

13. A brake control method for braking rotating reels of a tape recording/reproducing apparatus, comprising the steps of:
determining a supply reel period of a supply reel and a take-up reel period of a take-up reel;

providing a supply reel brake control signal to stop the supply reel from rotating and, after a first delay interval, providing a take-up reel brake control signal to stop the take-up reel from rotating when the supply reel period is greater than the take-up reel period;

providing the take-up reel brake control signal to stop the take-up reel from rotating and, after a second delay interval, providing the supply reel brake control signal to stop the supply reel from rotating when the take-up reel period is greater than the supply reel period; and simultaneously providing the supply reel and the take-up reel brake control signals to simultaneously stop the supply and take-up reels from rotating when the supply reel period equals the take-up reel period.

14. A brake control method for braking rotating reels of a tape recording/reproducing apparatus, comprising the steps of:

determining a supply reel moment of inertia and a take-up reel moment of inertia respectively, for a supply reel and a take-up reel of the apparatus;

providing a supply reel brake control signal to stop a supply reel from rotating and after a first delay interval, providing a take-up reel brake control signal to stop a take-up reel from rotating when the supply reel moment of inertia is greater than the take-up reel moment of inertia;

providing the take-up reel brake control signal to stop the take-up reel from rotating and, after a second delay interval, providing the supply reel brake control signal to stop the supply reel from rotating when the take-up reel moment of inertia is greater than the supply reel moment of inertia; and simultaneously providing the supply reel and the take-up reel brake control signals to simultaneously stop the supply and take-up reels from rotating when the supply reel moment of inertia equals the take-up reel moment of inertia.

15. A brake control method for braking rotating reels of a tape recording/reproducing apparatus, comprising the steps of:

determining an amount of tape on a supply reel and an amount of tape on a take-up reel;

providing a supply reel brake control signal to stop a supply reel from rotating and, after a first delay interval, providing a take-up reel brake control signal to stop a take-up reel from rotating when the amount of tape on the supply reel is greater than the amount of tape on the take-up reel;

providing the take-up reel brake control signal to stop the take-up reel from rotating and, after a second delay interval, providing the supply reel brake control signal to stop the supply reel from rotating when the amount of tape on the take-up reel is greater than the amount of tape on the supply reel; and simultaneously providing the supply reel and the take-up reel brake control signals to simultaneously stop the supply and take-up reels from rotating when the amount of tape on the supply reel equals the amount of tape on the take-up reel.

* * * * *

UNITED STATES PATENT AND TRADEMARK OFFICE
CERTIFICATE OF CORRECTION

PATENT NO. : 5,209,422
DATED : 11 May 1993
INVENTOR(S) : Chun-Sung Lee It is certified that error appears in the above-identified patent and that said Letters Patent is hereby corrected as shown below:

Column 2,

Line 16,    after "Reference", insert --will now be--;

Line 20,    delete "running";

Line 43,    after "brake" insert --control signal BD2--;

Line 54,    change "periods" to --period--;

Column 3,

Line 41,    delete "take up";

UNITED STATES PATENT AND TRADEMARK OFFICE
CERTIFICATE OF CORRECTION

PATENT NO. : 5,209,422
DATED : May 11, 1993
INVENTOR(S) : Chun-Sung Lee

It is certified that error appears in the above-indentified patent and that said Letters Patent is hereby corrected as shown below:

Column 3, line 58, delete "and then brakes".

Signed and Sealed this

Sixth Day of September, 1994

Attest:

BRUCE LEHMAN

*Attesting Officer*      *Commissioner of Patents and Trademarks*